US011828366B2

(12) United States Patent
Kikuchi (10) Patent No.: US 11,828,366 B2
(45) Date of Patent: Nov. 28, 2023

(54) SEALING DEVICE (71) Applicant: NOK CORPORATION, Tokyo (JP)

(72) Inventor: Kenichi Kikuchi, Fukushima (JP)

(73) Assignee: NOK CORPORATION, Tokyo (JP)

( * ) Notice: Subject to any disclaimer, the term of this patent is extended or adjusted under 35 U.S.C. 154(b) by 62 days.

(21) Appl. No.: 17/599,026

(22) PCT Filed: Feb. 28, 2020

(86) PCT No.: PCT/JP2020/008283
§ 371 (c)(1),
(2) Date: Sep. 28, 2021

(87) PCT Pub. No.: WO2020/202948
PCT Pub. Date: Oct. 8, 2020

(65) Prior Publication Data
US 2022/0178448 A1 Jun. 9, 2022

(30) Foreign Application Priority Data
Mar. 29, 2019 (JP) .................................. 2019-065345

(51) Int. Cl.
*F16J 15/3232* (2016.01)
(52) U.S. Cl.
CPC ................... *F16J 15/3232* (2013.01)
(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS

2010/0109252 A1* 5/2010 Matsui ................... F16J 15/324
277/559
2011/0095486 A1* 4/2011 Nakagawa ........... F16J 15/3244
277/549

FOREIGN PATENT DOCUMENTS

CN 204284452 4/2015
JP 6-73545 10/1994
(Continued)

OTHER PUBLICATIONS

Extended European Search Report issued in EP application No. 20784733.6, dated Oct. 19, 2022.
(Continued)

*Primary Examiner* — Nathan Cumar
(74) *Attorney, Agent, or Firm* — GREENBLUM & BERNSTEIN, P.L.C.

(57) ABSTRACT

A sealing device includes a reinforcement ring and an annular elastic body portion including a main body covering the reinforcement ring, a lip waist portion including an inner circumferential edge portion of the main body, a main lip extending from the lip waist portion to a first target side to be sealed and is to be in slidable contact with a rotary shaft, and a second dust lip extending from the lip waist portion to a second target side opposite to the first target side relative to the sealing device and being provided relative to the main lip with an annular space between the second dust lip and the main lip. The second dust lip includes a first lip slide portion being to be in slidable contact with the rotary shaft, a first protrusion formed on an inner circumferential surface of the second dust lip and closer to the first lip slide portion, and a second protrusion formed on the inner circumferential surface and closer to the lip waist portion than the first protrusion.

4 Claims, 6 Drawing Sheets (58) Field of Classification Search
CPC .. F16J 15/3208; F16J 15/3212; F16J 15/3216; F16J 15/322; F16J 15/3224; F16J 15/3228; F16J 15/3232; F16J 15/3236; F16J 15/3252; F16J 15/3268
USPC .......................................................... 277/562
See application file for complete search history.

(56) References Cited

FOREIGN PATENT DOCUMENTS

| | | |
|---|---|---|
| JP | 2583861 Y2 * | 10/1998 |
| JP | 2008-309273 | 12/2008 |
| JP | 2012-72822 | 4/2012 |

OTHER PUBLICATIONS

International Search Report issued in International Bureau of WIPO Patent Application No. PCT/JP2020/008283, dated Apr. 14, 2020, along with an English translation thereof.
Written Opinion issued in International Bureau of WIPO Patent Application No. PCT/JP2020/008283, dated Apr. 14, 2020, along with an English translation thereof.

* cited by examiner

SEALING DEVICE

TECHNICAL FIELD

The present invention relates to a sealing device.

BACKGROUND ART

A sealing device such as an oil seal used for a shaft seal part in various types of apparatuses is formed mainly by an annular metal ring, a rubber elastic body portion covering the metal ring, and a spring member attached to the rubber elastic body portion. The rubber elastic body portion has, for example, a main lip that comes into contact with a rotary shaft and a dust lip that prevents foreign matters such as muddy water, sand, and dust from entering the sealing side. For severe dusty conditions, the number of dust lips is increased or the amount of interference in the press fitting of the dust lip is increased to deal with such conditions.

When a rotary shaft rotates, a negative pressure is generated in an annular space formed between the main lip and the dust lip. Then, the dust lip can be deformed and pulled toward the annular space and experience more friction against the rotary shaft. Thus, for example, the invention according to Patent Literature 1 prevents generation of a negative pressure in the annular space by providing a plurality of protrusions (ribs) at a tip edge portion of the dust lip to allow the annular space to communicate with the non-sealing side.

CITATION LIST

Patent Literature

Patent Literature 1: Japanese Patent Application Publication No. 2008-309273

SUMMARY OF INVENTION

Technical Problem

As wear of the dust lip progresses due to a friction between the dust lip and the rotary shaft, the protrusions also wear away accordingly. What is desired is a sealing apparatus capable of sustaining the negative pressure prevention function and having longer sealing life even if the wear progresses.

In view of the above, the present invention has an object to provide a sealing apparatus capable of having longer sealing life.

Solution to Problem

In response to the above issue, it is an object of the present invention to provide a sealing device configured to seal an annular gap between two members coupled concentrically and rotatably relative to each other. The sealing device includes a reinforcement ring and an annular elastic body portion including a main body covering the reinforcement ring, a lip waist portion including an inner circumferential edge portion of the main body, a main lip extending from the lip waist portion to a first target side to be sealed and is to be in slidable contact with one of the two members, and at least one dust lip extending from the lip waist portion to a second target side opposite to the first target side relative to the sealing device and being provided relative to the main lip with an annular space between the at least one dust lip and the main lip. The at least one dust lip includes a first lip slide portion being to be in slidable contact with the one of the two members, a first protrusion formed on an inner circumferential surface of the at least one dust lip and closer to the first lip slide portion, and a second protrusion formed on the inner circumferential surface and closer to the lip waist portion than the first protrusion.

According to the present invention, even if the tip edge portion of and the first protrusion on the dust lip wear away, the second protrusion, located closer to the lip waist portion than the first protrusion is, comes into contact with the one of the members. Thus, the negative pressure function can be sustained. This allows the sealing apparatus to have longer sealing life.

In some embodiments, the main lip further includes a second lip slide portion being to be in slidable contact with the one of the two members and a slanted surface extending from the second lip slide portion toward the second target side and comprising a thread-like portion allowing a target fluid to be delivered to the first target side through the threaded portion. This helps further prevent leak of a fluid to be sealed even more.

In some embodiments, at least one of the first protrusion and the second protrusion comprises a set of protrusions arranged side by side at space intervals respectively. This allows the gap to serve as a communicating path when a negative pressure is generated and therefore allows air to flow stably.

Advantageous Effects of Invention

The sealing apparatus of the present invention can have longer sealing life.

DESCRIPTION OF EMBODIMENTS

Figure 1:
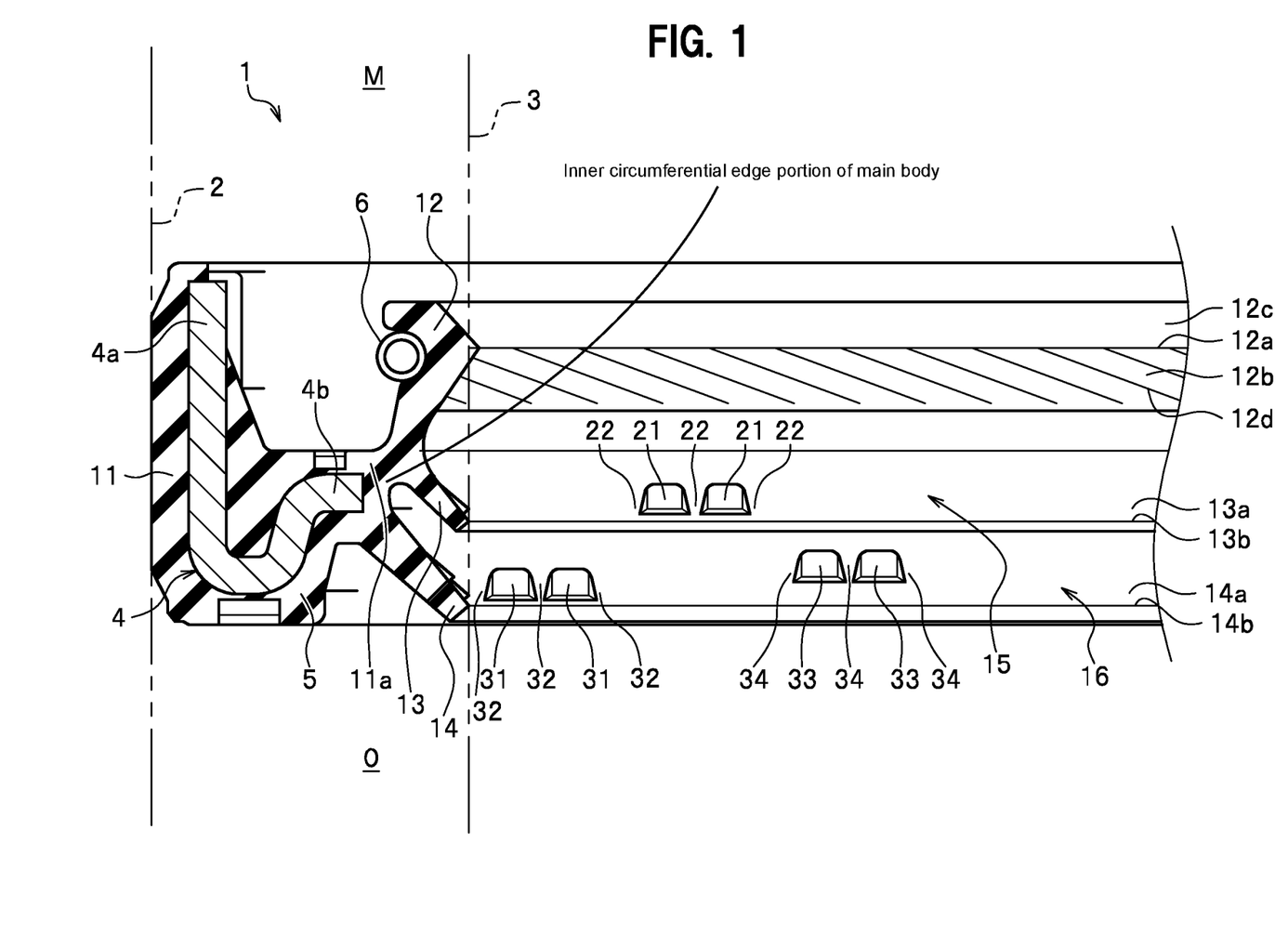
FIG. 1 is a schematic diagram of a sealing apparatus according to a first embodiment.

As shown in FIG. 1, a sealing apparatus 1 is an apparatus that seals an annular space between a housing 2 and a rotary shaft 3 which are assembled concentrically and rotatably relative to each other. The rotary shaft 3 is a shaft inserted to the housing 2 and corresponds to the "one of the two members" assembled concentrically and rotatably relative to each other.

For example, the sealing apparatus 1 is used to seal a space between the crankshaft and the front cover of an engine in an agricultural machine where a large amount of foreign matter, such as dust, is generated. The sealing apparatus 1 can also be used for a construction machine, an automobile, or the like. The sealing apparatus 1 is formed mainly by an annular reinforcement ring 4, an elastic body portion 5 that covers the reinforcement ring 4, and a spring member 6 attached to the elastic body portion 5. The elastic body portion 5 is formed mainly by a main body 11, a main lip 12, a first dust lip 13, and a second dust lip 14.

A first annular space 15 which is an annular space is formed between the main lip 12 and the first dust lip 13 over the circumferential direction. Also, a second annular space 16 which is an annular space is formed between the first dust lip 13 and the second dust lip 14.

The main lip 12 is a part that comes into contact with the rotary shaft 3 to seal a fluid to be sealed. The first dust lip 13 and the second dust lip 14 are parts that come into contact with the rotary shaft 3 to prevent foreign matters such as muddy water, sand, and dust from intruding from a non-sealing side O.

The first dust lip 13 and the second dust lip 14 each extend obliquely from a lip waist portion 11a of the main body 11 of the elastic body portion 5 toward the non-sealing side O. A plurality of sets of first protrusions 31, 31 are formed on a tip edge portion 14a of the inner circumferential surface of the second dust lip 14 over the circumferential direction. A plurality of sets of second protrusions 33, 33 are also formed on the inner circumferential surface of the second dust lip 14 over the circumferential direction, at positions closer to the lip waist portion 11a than the first protrusions 31, 31 are.

Because the second protrusions 33, 33 are provided closer to the lip waist portion 11a than the first protrusions 31, 31 are, even if the tip edge portion 14a of the second dust lip 14 and the first protrusions 31, 31 wear away, the second protrusions 33, 33 come into contact with the rotary shaft 3, so that the negative pressure prevention function can be sustained. This enables the sealing apparatus 1 to have longer sealing life. The following describes embodiments in detail.

First Embodiment

As shown in FIG. 1, the reinforcement ring 4 is formed by a cylindrical portion 4a which is hollow cylindrical and a flange portion 4b that extends radially inward from an edge portion of the cylindrical portion 4a. The reinforcement ring 4 is made of, for example, stainless steel or SPCC (steel plate cold commercial).

The elastic body portion 5 includes the main body 11 that covers the reinforcement ring 4, as well as the main lip 12, the first dust lip 13, and the second dust lip 14 that are provided radially inside the main body 11. The elastic body portion 5 is made of, for example, a rubber material of various kinds. Examples of the rubber material include synthetic rubbers such as nitrile rubber (NBR), hydrogenated nitrile rubber (H—NRB), acrylic rubber (ACM), and fluoro-rubber (FKM). The reinforcement ring 4 and the main body 11 form a fitting portion fitted to the inner circumference of the housing 2.

The reinforcement ring 4 is manufactured by, for example, press working or forging. The elastic body portion 5 is formed by cross-linking (vulcanizing) molding using a mold. In this cross-linking molding, the reinforcement ring 4 placed in a mold is bonded to the elastic body portion 5 by cross-linking adhesion, so that the reinforcement ring 4 and the elastic body portion 5 are integrally formed.

The annular lip waist portion 11a is formed at a radially inward edge portion of the main body 11. The lip waist portion 11a is away from the rotary shaft 3 and is a portion to serve as a base of the main lip 12, the first dust lip 13, and the second dust lip 14.

The main lip 12 extends from the lip waist portion 11a to a sealing side M. The tip edge of the main lip 12 is in slidable contact with the rotary shaft 3. The main lip 12 is triangular in section, protruding radially inward. The main lip 12 has a non-sealing-side slanted surface 12b as a circumferential surface slanted in such a manner as to be gradually increased in diameter toward the non-sealing side O from a lip slide portion 12a that comes into slidable contact with the side circumferential surface of the rotary shaft 3, and a sealing-side slanted surface 12c as a circumferential surface slanted in such a manner as to be gradually increased in diameter from the lip slide portion 12a to the sealing side M.

A thread-like portion 12d is formed over the entire circumference of the non-sealing-side slanted surface 12b. The thread-like portion 12d is formed by a plurality of thread protrusions that are slanted in the same direction at a predetermined angle. This produces a pump function, conveying a to-be-sealed fluid trying to leak to the non-sealing side O along the main lip 12 to the sealing side M. Note that the thread-like portion 12d does not have to be provided.

The spring member 6, such as a garter spring, is attached radially outside the main lip 12, applying tension to the sealing portion at the lip's tip edge. Note that the garter spring may be omitted.

The first dust lip (intermediate lip) 13 is slanted from the lip waist portion 11a of the main body 11 toward the non-sealing side O. The first dust lip 13 is formed between the main lip 12 and the second dust lip 14. A tip edge portion 13a of the first dust lip 13 comes into slidable contact with the rotary shaft 3 via a lip slide portion 13b. The first dust lip 13 is formed such that its thickness decreases toward the tip edge thereof (radially inward). The inner circumferential surface of the first dust lip 13 is a tapered surface decreasing in diameter toward the non-sealing side O.

Figure 3:
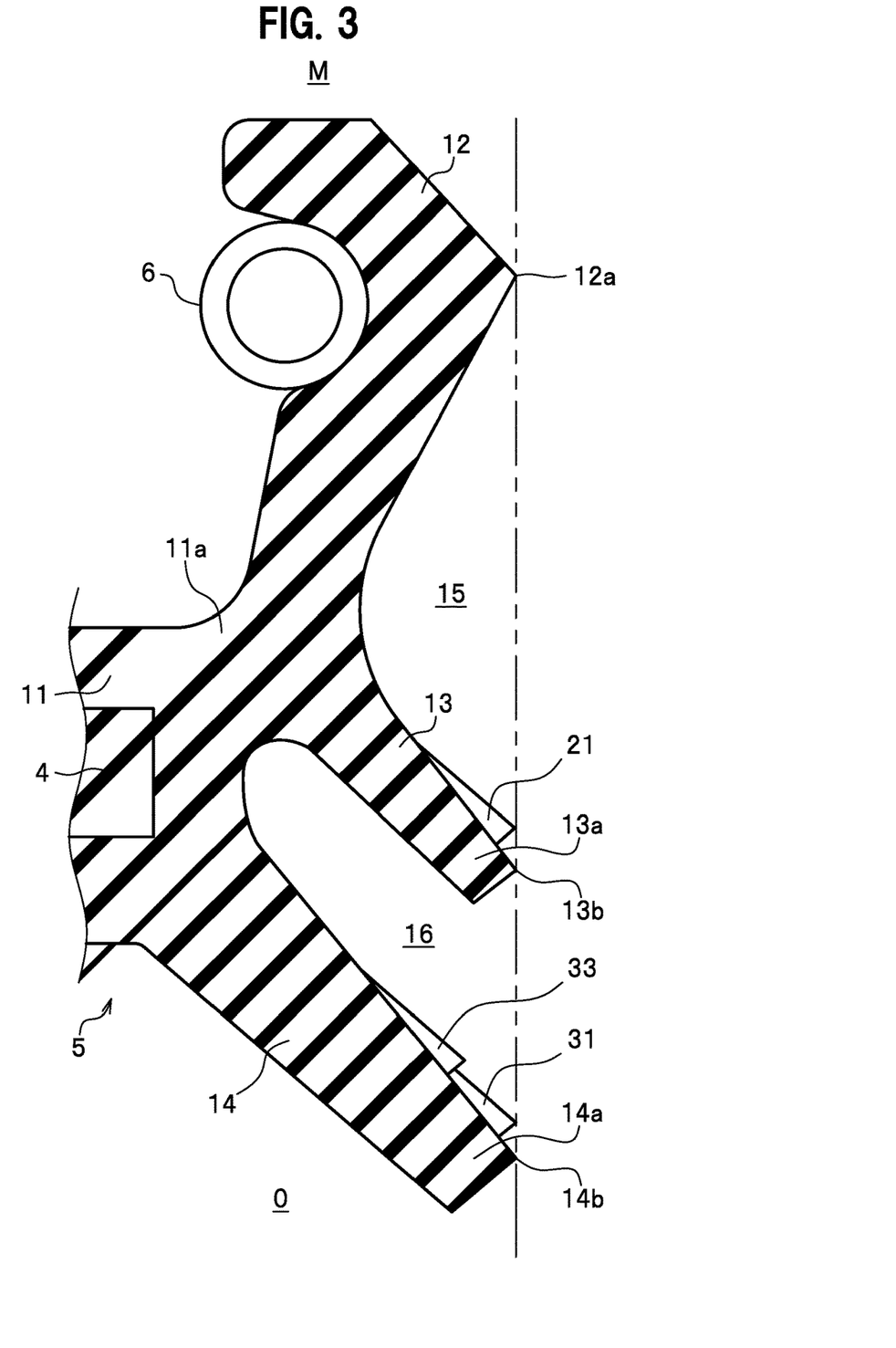
FIG. 3 is a schematic sectional view of the sealing apparatus according to the first embodiment.

The inner circumferential surface of the first dust lip 13 is provided with first protrusions 21, 21. As shown in FIG. 3, the first protrusions 21, 21 are provided on the tip edge portion 13a and face the side circumferential surface of the rotary shaft 3 either in a contacting manner or with a minute gap therefrom. Each first protrusion 21 is substantially wedge shaped, gradually increased in thickness toward the tip edge portion 13a. Two first protrusions 21 form a set, and in the present embodiment, three sets of first protrusions 21 are formed at equal intervals in the circumferential direction of the first dust lip 13. The arrangement positions of the first protrusions 21, 21 in the circumferential direction and the number of the first protrusions 21, 21 may be set appropriately. In the present embodiment, the first protrusions 21, 21 are placed at positions offset from each set of the first protrusions 31, 31 and the second protrusions 33, 33 to be described later in the circumferential direction. A communicating path 22 through which air flows when a certain negative pressure is exerted in the first annular space 15 is formed at positions adjacent to the first protrusions 21 in the circumferential direction.

The second dust lip (outermost lip) 14 is slanted from the lip waist portion 11a of the main body 11 toward the non-sealing side O. The second dust lip 14 is formed closer to the non-sealing side O than the first dust lip 13 is. The tip edge portion 14a of the second dust lip 14 comes into slidable contact with the rotary shaft 3 via a lip slide portion 14b. The second dust lip 14 is formed such that its thickness decreases toward the tip edge thereof (radially inward). The inner circumferential surface of the second dust lip 14 is a tapered surface decreasing in diameter toward the non-sealing side O.

The inner circumferential surface of the second dust lip 14 is provided with the first protrusions 31, 31. As shown in FIG. 3, the first protrusions 31, 31 face the side circumferential surface of the rotary shaft 3 either in a contacting manner or with a minute gap therefrom. Each first protrusion 31 is substantially wedge shaped, gradually increased in thickness toward the tip edge portion 14a. Two first protrusions 31 form a set, and in the present embodiment, three sets of first protrusions 31 are formed at equal intervals in the circumferential direction of the second dust lip 14. The arrangement positions of the first protrusions 31, 31 in the circumferential direction and the number of the first protrusions 31, 31 may be set appropriately. A communicating path 32 through which air flows when a certain negative pressure is exerted in the second annular space 16 is formed at positions adjacent to the first protrusions 31 in the circumferential direction.

As shown in FIG. 1, the inner circumferential surface of the second dust lip 14 is provided with the second protrusions 33, 33 at positions closer to the lip waist portion 11a than the first protrusions 31 are. In other words, the second protrusions 33, 33 are provided at positions where the diameter is larger than where the first protrusions 31, 31 are provided. Each second protrusion 33 is substantially wedge shaped, gradually increased in thickness toward the tip edge portion 14a. Two second protrusions 33 form a set, and in the present embodiment, three sets of second protrusions 33 are formed at equal intervals in the circumferential direction of the second dust lip 14. A communicating path 34 through which air flows when a certain negative pressure is exerted in the second annular space 16 is formed at positions adjacent to the second protrusions 33 in the circumferential direction.

Figure 2:
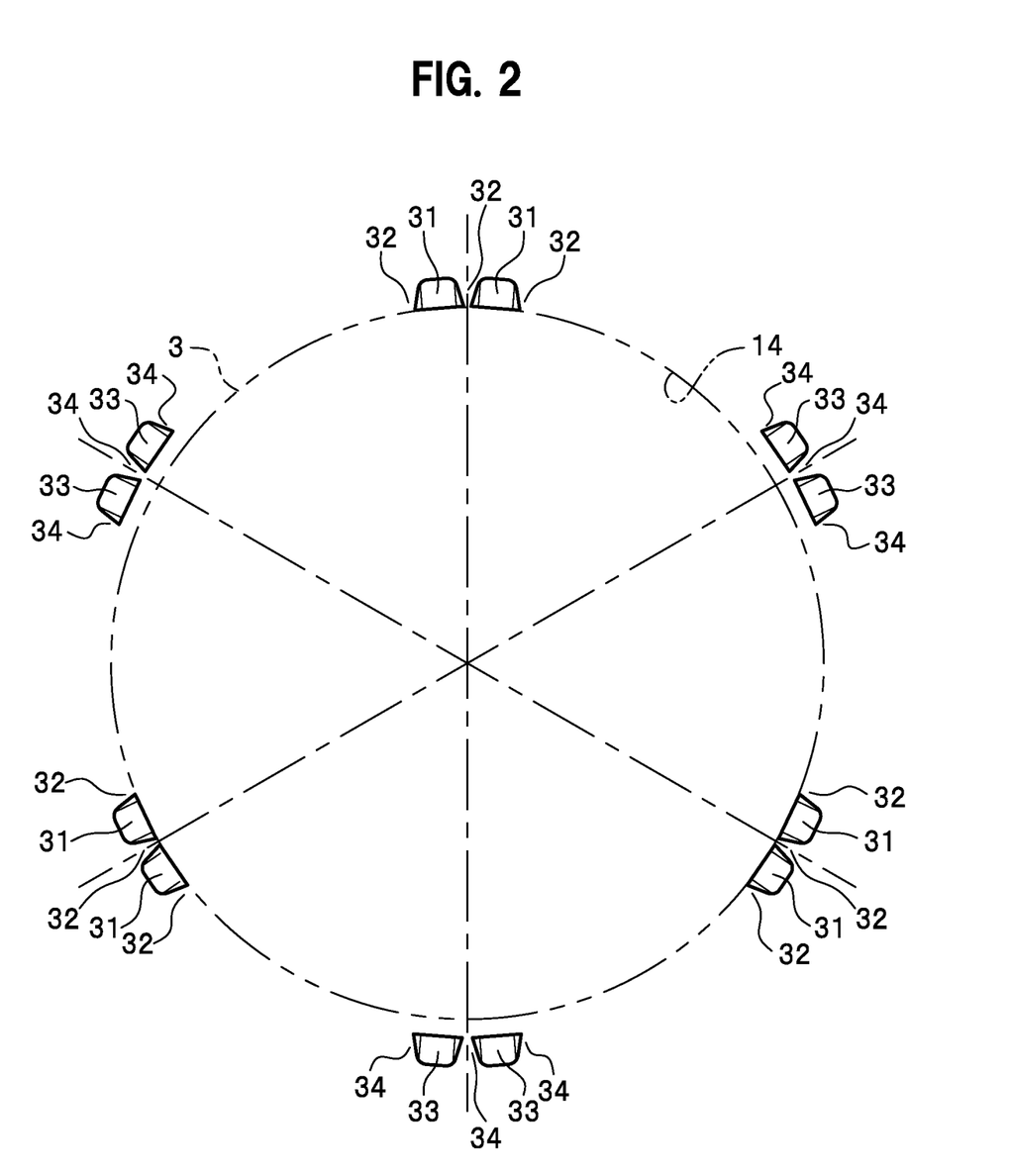
FIG. 2 is a schematic plan view showing the arrangement of first protrusions and second protrusions of the sealing apparatus according to the first embodiment.

The arrangement positions of the second protrusions 33, 33 in the circumferential direction and the number of the second protrusions 33, 33 may be set appropriately. In the present embodiment, as shown in FIG. 2, the first protrusions 31, 31 and the second protrusions 33, 33 are arranged alternately at a pitch of approximately 60°. Also, the positions of the second protrusions 33, 33 on the inner circumferential surface of the second dust lip 14 in the radial direction may be set such that the second protrusions 33, 33 come into contact with the rotary shaft 3 when (or at the timing when) the first protrusions 31, 31 wear away by sliding against the rotary shaft 3.

Next, the operation and advantageous effects of the sealing apparatus 1 according to the present embodiment are described. As shown in FIG. 3, the lip slide portion 12a of the main lip 12 is in slidable contact with the side circumferential surface of the rotary shaft 3. This can prevent a fluid to be sealed from leaking from the sealing side M to the non-sealing side O. The lip slide portion 13b of the first dust lip 13 and the lip slide portion 14b of the second dust lip 14 are also in slidable contact with the side circumferential surface of the rotary shaft 3. This prevents intrusion of foreign matters from the non-sealing side O to the sealing side M. Provided with a plurality of dust lips, namely the first dust lip 13 and the second dust lip 14, the present embodiment is especially effective for use in a dusty environment.

When the rotary shaft 3 rotates, the pump effect produced by the thread-like portion 12d of the main lip 12 causes a larger negative pressure to be generated in the first annular space 15 and the second annular space 16. In this event, the lip slide portion 13b of the first dust lip 13 and the lip slide portion 14b of the second dust lip 14 are pulled toward the rotary shaft 3, so that the areas of their contact portions with the rotary shaft 3 become larger.

However, the first protrusions 21, 31 are provided to the tip edge portions 13a, 14a, and the side circumferential portions of the first protrusions 21, 31 in the circumferential direction are away from the rotary shaft 3 and form gaps (the communicating paths 22 and the communicating paths 32), allowing air on the atmospheric side to flow in through these gaps. Thus, the negative pressures in the first annular space 15 and the second annular space 16 are cancelled.

Also, when wear of the tip edge portion 14a of the second dust lip 14 progresses, the first protrusions 31, 31 also wear away accordingly, which may lead to deterioration of the negative pressure prevention function. However, in the present embodiment, the second protrusions 33, 33 are provided on the inner circumferential surface of the second dust lip 14 at positions closer to the lip waist portion 11a than the first protrusions 31, 31 are. Thus, when a negative pressure is generated in the second annular space 16, the lip slide portion 14b of the second dust lip 14 is pulled toward the rotary shaft 3, and the area of its contact portion with the rotary shaft 3 becomes larger. However, the gaps (the communicating paths 34) are formed by the side circumferential surfaces of the second protrusions 33 in the circumferential direction that are away from the rotary shaft 3, and air on the atmospheric side flows in through the gaps, cancelling the negative pressure in the second annular space 16. Thus, even if the tip edge portion 14a of the second dust lip 14 and the first protrusions 31, 31 wear away, the negative pressure prevention function can be sustained, allowing the sealing apparatus 1 to have longer sealing life.

Also, since the sets of the first protrusions 21, 31 and the sets of the second protrusions 33 are arranged at equal intervals in the circumferential direction (equiangularly in the circumferential direction), well-balanced negative pressure prevention function can be obtained. Also, in the present embodiment, the thread-like portion 12d is provided on the non-sealing-side slanted surface 12b of the main lip 12. Thus, the pump effect produced thereby allows the to-be-sealed fluid to be conveyed to the sealing side M, preventing leak of the to-be-sealed fluid more.

In addition, in the present embodiment, two or more protrusions (two in the present embodiment) form a set and are arranged side by side with a gap therebetween. Thus, the gap between the protrusions can serve as the communicating path 22, 32, 34, allowing air to flow stably. The negative pressure prevention function can be adjusted appropriately by changing the height of each protrusion (how high each lip rises from the inner circumferential surface), the width of each protrusion (in the circumferential direction), the number of protrusions arranged (at equal intervals), the interval between protrusions in each set, and the like. Also, the life of the negative pressure prevention function can be adjusted by adjustment of the distance from the rotary shaft 3 to the first protrusions 31 and the distance from the rotary shaft 3 to the second protrusions 33.

When two dust lips are provided like in the present embodiment, the first protrusions 21, 21 and the first protrusions 31, 31 may be arranged at the same angles in the circumferential direction. In addition, although a set of two protrusions is formed at each location in the above, the protrusion set may be formed by only one protrusion or by three or more protrusions arranged side by side as a set, as long as a gap is formed to allow air to pass therethrough when a negative pressure is exerted.

Second Embodiment

Figure 4:
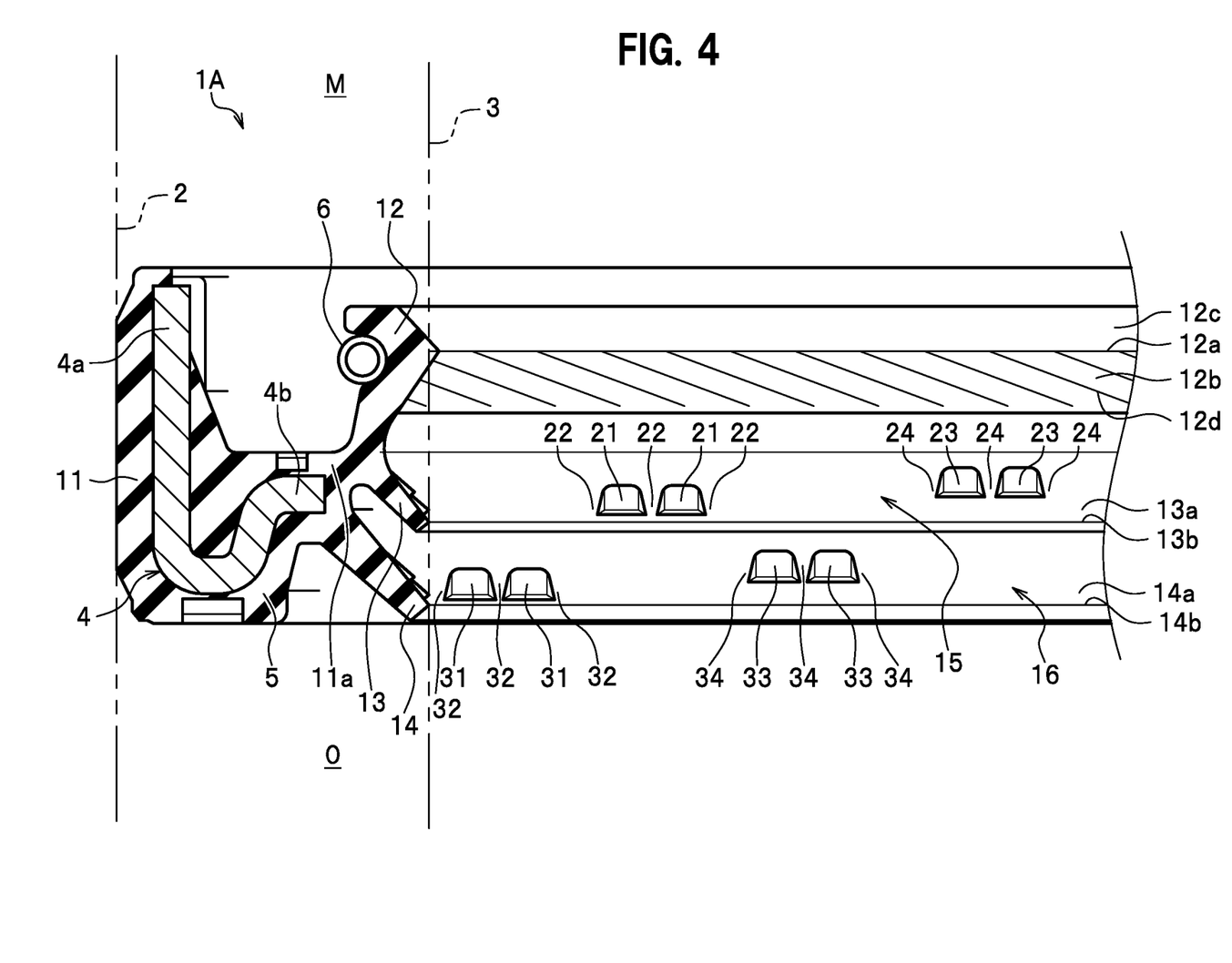
FIG. 4 is a schematic diagram of a sealing apparatus according to a second embodiment.

FIG. 4 is a schematic diagram of a sealing apparatus according to a second embodiment. As shown in FIG. 4, a sealing apparatus 1A according to the second embodiment differs from the first embodiment in that the first dust lip 13 is also provided with second protrusions 23, 23. The following mainly describes the differences of the second embodiment from the first embodiment.

The first protrusions 21, 21 are provided on the inner circumferential surface of the first dust lip 13 over the circumferential direction. The first protrusions 21, 21 are, in the present embodiment, arranged at positions offset from the first protrusions 31, 31 and the second protrusions 33, 33 in the circumferential direction.

The inner circumferential surface of the first dust lip 13 is provided with the second protrusions 23, 23 at positions closer to the lip waist portion 11a than the first protrusions 21 are. In other words, the second protrusions 23, 23 are provided at positions where the diameter is larger than where the first protrusions 21, 21 are provided. Each second protrusion 23 has a wedge shape gradually increased in thickness toward the tip edge portion 13a. Two second protrusions 23 form a set, and in the present embodiment, three sets of second protrusions 23 are formed at equal intervals in the circumferential direction. A communicating path 24 through which air flows when a certain negative pressure is exerted in the first annular space 15 is formed at positions adjacent to the second protrusions 23 in the circumferential direction.

The arrangement positions of the second protrusions 23, 23 in the circumferential direction and the number of the second protrusions 23, 23 may be set appropriately. In the present embodiment, the first protrusions 21, 21 and the second protrusions 23, 23 are placed at a pitch of approximately 60°. Also, the second protrusions 23, 23 are arranged at positions offset from each set of the first protrusions 21, 21, the first protrusions 31, 31, and the second protrusions 33, 33 in the circumferential direction. The positions of the second protrusions 23, 23 on the inner circumferential surface of the first dust lip 13 in the radial direction may be set such that the second protrusions 23, 23 come into contact with the rotary shaft 3 when (or at the timing when) the first protrusions 21, 21 wear away by sliding against the rotary shaft 3.

Next, the operation and advantageous effects of the sealing apparatus 1A according to the second embodiment are described. The operation and advantageous effects of the first dust lip 13 are mainly described because the operation and advantageous effects of the second dust lip 14 of the second embodiment are the same as those of the first embodiment.

When a negative pressure is generated in the first annular space 15, the lip slide portion 13b of the first dust lip 13 is pulled toward the rotary shaft 3, so that the area of its contact portion with the rotary shaft 3 becomes larger.

However, the first protrusions 21 are provided to the tip edge portion 13a, and the side circumferential portions of the first protrusions 21 in the circumferential direction are away from the rotary shaft 3 and form gaps (the communicating paths 22), allowing air on the atmospheric side to flow in through these gaps. Thus, the negative pressure in the first annular space 15 is cancelled.

Also, when wear of the tip edge portion 13a of the first dust lip 13 progresses, the first protrusions 21, 21 also wear away accordingly, which may lead to deterioration of the negative pressure prevention function. However, in the present embodiment, the second protrusions 23, 23 are provided on the inner circumferential surface of the first dust lip 13 at positions closer to the lip waist portion 11a than the first protrusions 21, 21 are. Thus, when a negative pressure is generated in the first annular space 15, the lip slide portion 13b of the first dust lip 13 is pulled toward the rotary shaft 3, and the area of its contact portion with the rotary shaft 3 becomes larger. However, the gaps (the communicating paths 24) are formed by the side circumferential surfaces of the second protrusions 23 in the circumferential direction that are away from the rotary shaft 3, and air on the atmospheric side flows in through the gaps, cancelling the negative pressure in the first annular space 15. Thus, even if the tip edge portion 13a and the first protrusions 21, 21 wear away, the negative pressure prevention function can be sustained, allowing the sealing apparatus 1A to have longer sealing life.

Also, since the sets of the first protrusions 21 and the sets of the second protrusions 23 are arranged at equal intervals in the circumferential direction (equiangularly in the circumferential direction), well-balanced negative pressure prevention function can be obtained. Also, the present embodiment is especially effective for use in a dusty environment because a plurality of dust lips (the first dust lip 13 and the second dust lip 14) are provided, with each of the dust lips being provided with the second protrusions 23, 33.

In addition, in the present embodiment, two or more protrusions (two in the present embodiment) form a set and are arranged side by side with a gap therebetween. Thus, the gap between the protrusions can serve as the communicating path 22, 24, 32, 34, allowing air to flow stably. The negative pressure prevention function can be adjusted appropriately by changing the height of each protrusion (how high each lip rises from the inner circumferential surface), the width of each protrusion (in the circumferential direction), the number of protrusions arranged (at equal intervals), the interval between protrusions in each set, and the like. Also, the life of the negative pressure prevention function can be adjusted by adjustment of the distance from the rotary shaft 3 to the first protrusions 31 and the distance from the rotary shaft 3 to the second protrusions 33, as well as the distance from the rotary shaft 3 to the first protrusions 21 and the distance from the rotary shaft 3 to the second protrusions 23.

When two dust lips are provided like in the present embodiment, the first protrusions 21, 21 and the first protrusions 31, 31 may be arranged at the same angles in the circumferential direction. In addition, although a set of two protrusions is formed at each location in the above, the protrusion set may be formed by only one protrusion or by three or more protrusions arranged side by side as a set, as long as a gap is formed to allow air to pass therethrough when a negative pressure is exerted.

Third Embodiment

Figure 5:
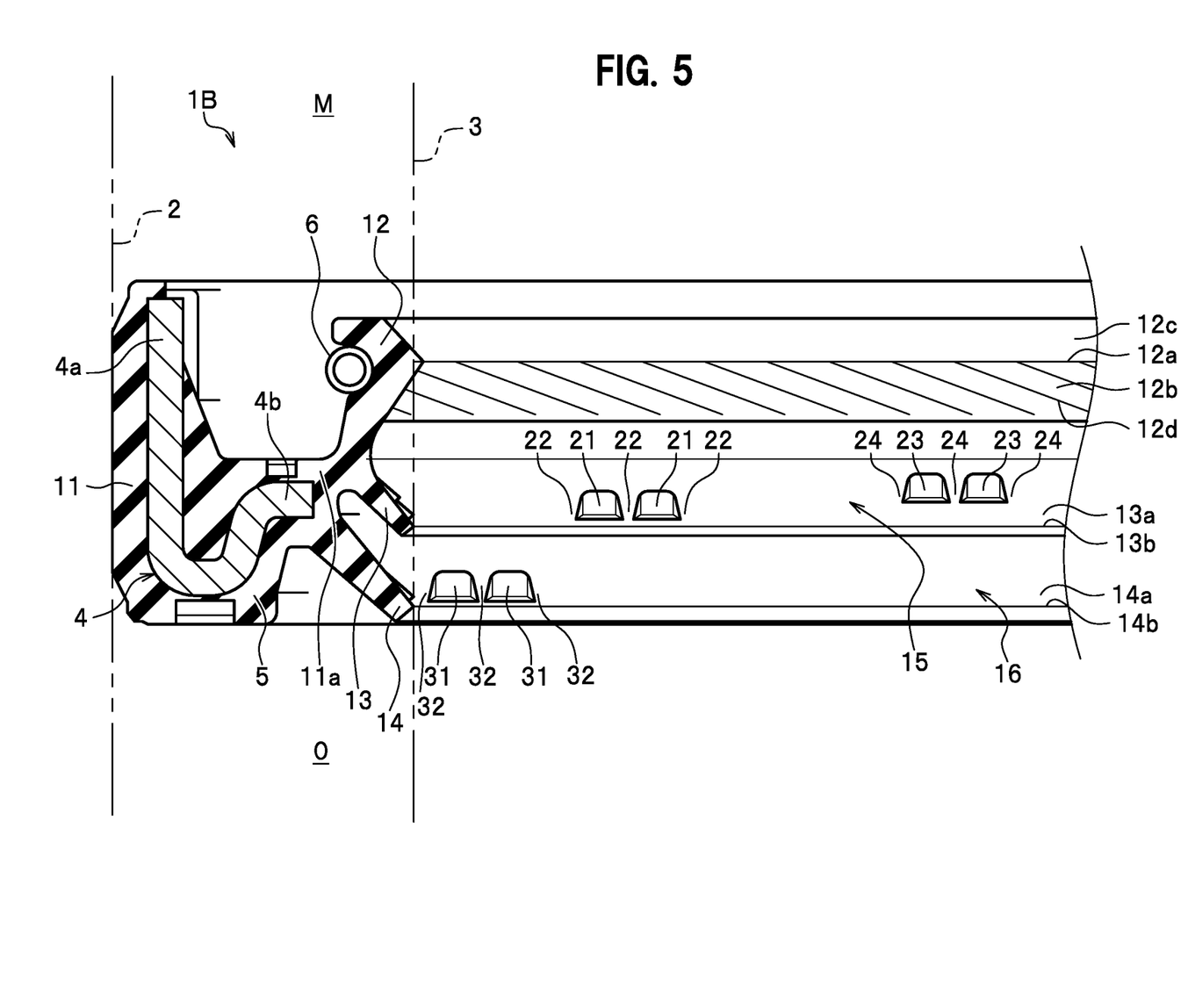
FIG. 5 is a schematic diagram of a sealing apparatus according to a third embodiment

FIG. 5 is a schematic diagram of a sealing apparatus according to a third embodiment. As shown in FIG. 5, a sealing apparatus 1B according to the third embodiment differs from the second embodiment in that the first dust lip 13 is provided with the first protrusions 21, 21 and the second protrusions 23, 23 but the second dust lip 14 is provided only with the first protrusions 31, 31. In other words, the second dust lip 14 is not provided with the second protrusions 33, 33.

The first protrusions and the second protrusions may be arranged like the sealing apparatus 1B according to the third embodiment. The first dust lip 13 of the third embodiment offers substantially the same operation and advantageous effects as the first dust lip 13 of the second embodiment (see FIG. 4).

In addition, in the present embodiment, two or more protrusions (two in the present embodiment) form a set and are arranged side by side with a gap therebetween. Thus, the gap between the protrusions can serve as the communicating path 22, 24, 32, allowing air to flow stably. The negative pressure prevention function can be adjusted appropriately by changing the height of each protrusion (how high each lip rises from the inner circumferential surface), the width of each protrusion (in the circumferential direction), the number of protrusions arranged (at equal intervals), the interval between protrusions in each set, and the like. Also, the life of the negative pressure prevention function can be adjusted by adjustment of the distance from the rotary shaft 3 to the first protrusions 21 and the distance from the rotary shaft 3 to the second protrusions 23.

When two dust lips are provided like in the present embodiment, the first protrusions 21, 21 and the first protrusions 31, 31 may be arranged at the same angles in the circumferential direction. In addition, although a set of two protrusions is formed at each location in the above, the protrusion set may be formed by only one protrusion or by three or more protrusions arranged side by side as a set, as long as a gap is formed to allow air to pass therethrough when a negative pressure is exerted.

Fourth Embodiment

Figure 6:
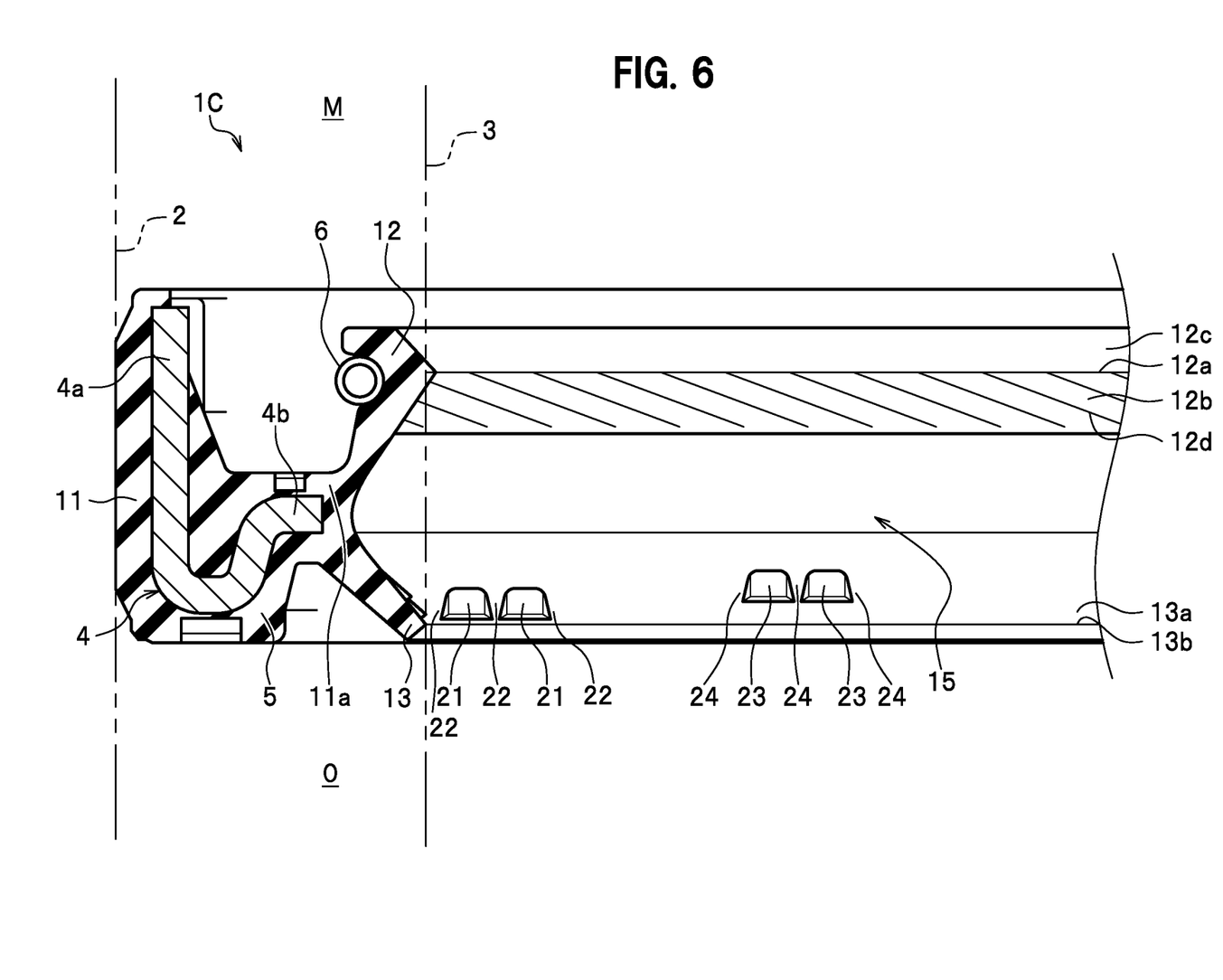
FIG. 6 is a schematic diagram of a sealing apparatus according to a fourth embodiment.

FIG. 6 is a schematic diagram of a sealing apparatus according to a fourth embodiment. As shown in FIG. 6, a sealing apparatus 1C according to the fourth embodiment differs from the other embodiments in having a single dust lip. The first dust lip 13 according to the fourth embodiment includes the first protrusions 21, 21 and the second protrusions 23, 23. The first protrusions and the second protrusions may be arranged like the sealing apparatus 1C according to the fourth embodiment. The first dust lip 13 of the fourth embodiment offers substantially the same operation and advantageous effects as the first dust lip 13 of the second embodiment (see FIG. 4).

In addition, in the present embodiment, two or more protrusions (two in the present embodiment) form a set and are arranged side by side with a gap therebetween. Thus, the gap between the protrusions can serve as the communicating path 22, 24, allowing air to flow stably. The negative pressure prevention function can be adjusted appropriately by changing the height of each protrusion (how high each lip rises from the inner circumferential surface), the width of each protrusion (in the circumferential direction), the number of protrusions arranged (at equal intervals), the interval between protrusions in each set, and the like. Also, the life of the negative pressure prevention function can be adjusted by adjustment of the distance from the rotary shaft 3 to the first protrusions 21 and the distance from the rotary shaft 3 to the second protrusions 23.

Although a set of two protrusions is formed at each location in the above, the protrusion set may be formed by only one protrusion or by three or more protrusions arranged side by side as a set, as long as a gap is formed to allow air to pass therethrough when a negative pressure is exerted.

The sealing apparatus of the present invention has been described above, but the sealing apparatus can be changed in design appropriately without departing from the gist of the present invention. For example, the number of necessary dust lips is at least one, and there may be three or more dust lips. In the above example, two groups of protrusions (the first protrusions and the second protrusions) are provided on each dust lip in the radial direction. However, one or more groups of protrusions may be provided additionally at positions closer to the lip waist portion 11a than the second protrusions are.

REFERENCE SIGNS LIST

1 sealing apparatus
2 housing
3 rotary shaft
4 reinforcement ring
5 elastic body portion
6 spring member
11 main body portion
11a lip waist portion
12 main lip
12b non-sealing-side slanted surface
12d thread-like portion
13 first dust lip
13a tip edge portion
13b lip slide portion
14 second dust lip
14a tip edge portion
14b lip slide portion
15 first annular space
16 second annular space
21 first protrusion
22 communicating path
23 second protrusion
24 communicating path
31 first protrusion
32 communicating path
33 second protrusion
34 communicating path
M sealing side
O non-sealing side

The invention claimed is:
1. A sealing device configured to seal an annular gap between two members coupled concentrically and rotatably relative to each other, the sealing device comprising:
   a reinforcement ring; and
   an annular elastic body portion comprising:
   (a) a main body covering the reinforcement ring;
   (b) a lip waist portion comprising an inner circumferential edge portion of the main body;
   (c) a main lip extending from the lip waist portion, wherein the main lip is configured to extend towards a first target side that is to be sealed, and wherein the main lip is configured to slidably contact one of the two members; and
   (d) at least one dust lip extending from the lip waist portion, wherein the at least one dust lip is configured to extend towards a second target side opposite to the first target side relative to the sealing device, and an annular space provided between the at least one dust lip and the main lip, the at least one dust lip comprising:
   (i) a first lip slide portion configured to slidably contact the one of the two members;
   (ii) a first protrusion formed on an inner circumferential surface of the at least one dust lip, and wherein the first protrusion is closer to the first lip slide portion than a second protrusion is to the first lip slide portion; and
   (iii) the second protrusion formed on the inner circumferential surface, wherein the second protrusion is closer to the lip waist portion than the first protrusion is to the lip waist portion, wherein the first protrusion is offset from the second protrusion so as not to overlap in a circumferential direction of the sealing device.

2. The sealing device according to claim 1, wherein the main lip further comprises:
   - a second lip slide portion configured to slidably contact the one of the two members; and
   - a slanted surface extending from the second lip slide portion, the slanted surface configured to extend towards the second target side and comprising a thread-like portion configured to allow a target fluid to be delivered to the first target side through the threaded portion.

3. The sealing device according to claim 2, wherein at least one of the first protrusion and the second protrusion comprises a set of protrusions arranged side by side at space intervals respectively.

4. The sealing device according to claim 1, wherein at least one of the first protrusion and the second protrusion comprises a set of protrusions arranged side by side at space intervals respectively.

* * * * *